United States Patent
Mizuno

(10) Patent No.: US 11,190,747 B2
(45) Date of Patent: Nov. 30, 2021

(54) DISPLAY CONTROL APPARATUS, DISPLAY CONTROL METHOD, AND STORAGE MEDIUM

(71) Applicant: CANON KABUSHIKI KAISHA, Tokyo (JP)

(72) Inventor: Takayoshi Mizuno, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/984,166

(22) Filed: May 18, 2018

(65) Prior Publication Data
US 2018/0343435 A1 Nov. 29, 2018

(30) Foreign Application Priority Data
May 25, 2017 (JP) .............................. JP2017-103649

(51) Int. Cl.
| | | |
|---|---|---|
| *H04N 13/117* | (2018.01) | |
| *G06T 3/60* | (2006.01) | |
| *G06T 3/00* | (2006.01) | |
| *H04N 7/18* | (2006.01) | |

(52) U.S. Cl.
CPC ......... *H04N 13/117* (2018.05); *G06T 3/0018* (2013.01); *G06T 3/0062* (2013.01); *G06T 3/60* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 10,275,661 | B2* | 4/2019 | Seki | G06K 9/4661 |
| 2002/0015049 | A1* | 2/2002 | Golin | G06T 15/20 |
| | | | | 345/629 |
| 2007/0127785 | A1* | 6/2007 | Hiraizumi | G06K 9/00281 |
| | | | | 382/118 |
| 2008/0174680 | A1* | 7/2008 | Ogino | H04N 5/772 |
| | | | | 348/231.99 |
| 2009/0268099 | A1* | 10/2009 | Kazumi | H04N 5/265 |
| | | | | 348/705 |
| 2010/0085462 | A1* | 4/2010 | Sako | G02B 27/017 |
| | | | | 348/333.01 |
| 2012/0045149 | A1 | 2/2012 | Arai | |
| 2012/0082341 | A1* | 4/2012 | Takeuchi | G09B 29/106 |
| | | | | 382/103 |

(Continued)

FOREIGN PATENT DOCUMENTS

| | | |
|---|---|---|
| CN | 102890748 A | 1/2013 |
| JP | 2012119804 A | 6/2012 |

(Continued)

*Primary Examiner* — Frederick D Bailey
(74) *Attorney, Agent, or Firm* — Canon U.S.A., Inc. IP Division

(57) ABSTRACT

In a case where an area which is a part of a captured image captured using a fisheye lens is designated, a generation unit generates a display image based on a position of the area designated in the captured image. The display image is an image in which the captured image is rotated about a predetermined position in the captured image so that a state of a subject included in the area becomes more erect. A display control unit causes the display image generated by the generation unit to be displayed on a display unit.

10 Claims, 13 Drawing Sheets

(56) References Cited

U.S. PATENT DOCUMENTS

| | | | |
|---|---|---|---|
| 2012/0147200 A1* | 6/2012 | Watanabe | H04N 5/23299 348/207.11 |
| 2012/0257025 A1* | 10/2012 | Kim | G06F 1/1694 348/51 |
| 2014/0118551 A1* | 5/2014 | Ikeda | G06K 9/00805 348/148 |
| 2014/0152787 A1* | 6/2014 | Listou | G03B 21/145 348/62 |
| 2015/0015738 A1 | 1/2015 | Kuwada | |
| 2015/0130839 A1* | 5/2015 | Kasahara | G06T 7/70 345/633 |
| 2016/0182854 A1* | 6/2016 | Suzuki | H04N 7/141 348/14.07 |
| 2016/0261802 A1* | 9/2016 | Okamoto | H04N 5/23203 |
| 2018/0295290 A1* | 10/2018 | Nakamura | H04N 13/20 |
| 2018/0367787 A1* | 12/2018 | Nakajima | H04N 13/351 |
| 2019/0197671 A1* | 6/2019 | Jeong | G06T 3/0062 |
| 2019/0335115 A1* | 10/2019 | Kumai | G09G 5/377 |

FOREIGN PATENT DOCUMENTS

| | | |
|---|---|---|
| JP | 201442160 A | 3/2014 |
| JP | 2014225108 A | 12/2014 |
| JP | 2016167739 A | 9/2016 |
| JP | 2016532954 A | 10/2016 |
| WO | 2007/055335 A1 | 5/2007 |
| WO | 2011/114610 A1 | 9/2011 |
| WO | 2013/150775 A1 | 10/2013 |

\* cited by examiner

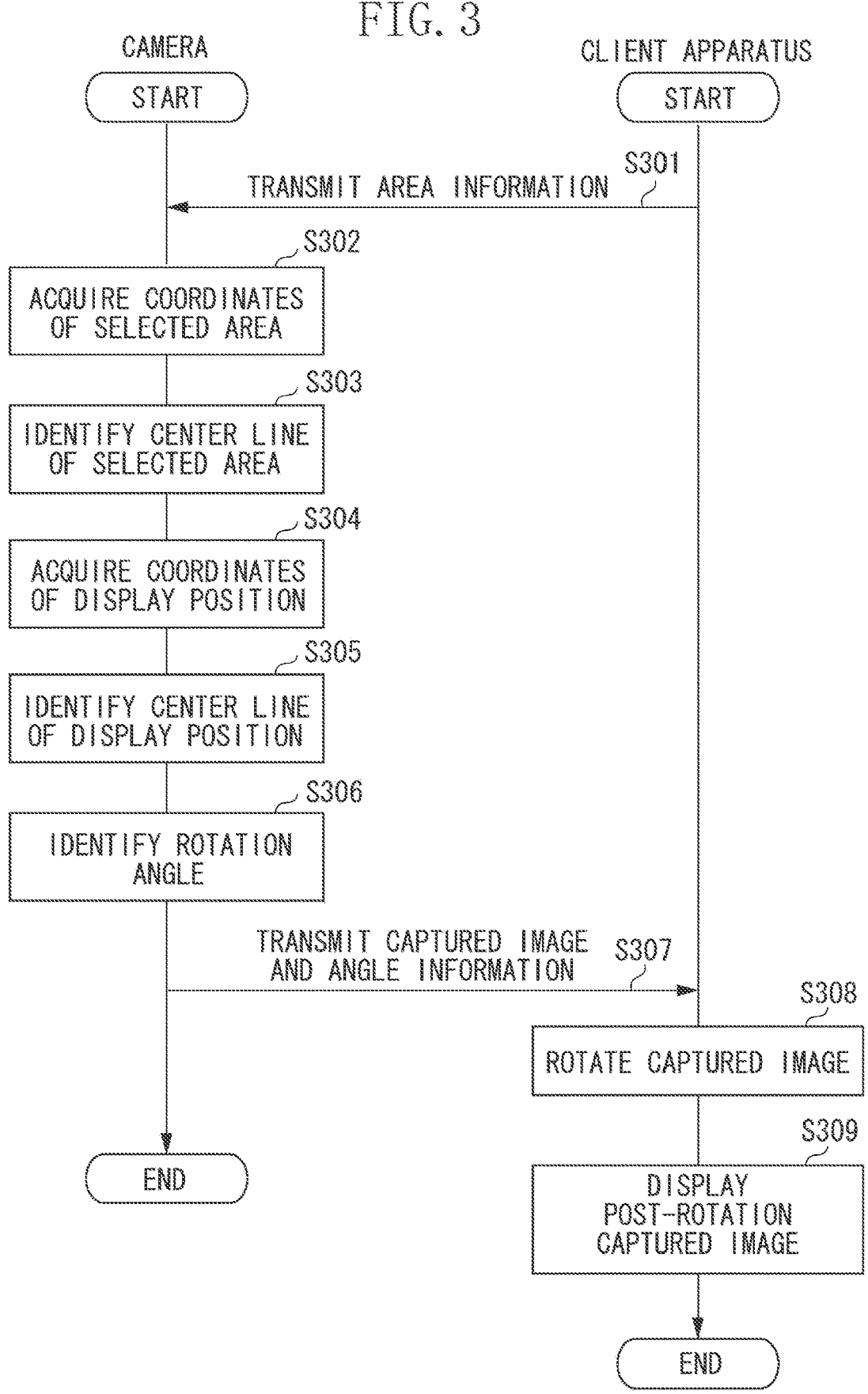

DISPLAY CONTROL APPARATUS, DISPLAY CONTROL METHOD, AND STORAGE MEDIUM

BACKGROUND OF THE INVENTION

Field of the Invention

The present invention relates to a display control apparatus, a display control method, and a storage medium.

Description of the Related Art

Conventionally, a network camera system that remotely controls a camera via a network to monitor a video image is known. A network camera system capable of controlling camera settings such as a focus, a zoom, an exposure, a resolution, white balance, and a frame rate at the time of image capturing is also known. Such a network camera system can switch a video image display method according to a target that is intended to be monitored, when a user checks a captured video image by a client apparatus. Examples of the video image display method include a method for displaying an entire image being captured by a camera, a method for displaying a designated area by cutting out the designated area, and a method for displaying a panoramic image by converting an entire image into the panoramic image. Herein, the video image to be displayed can be corrected according to an area being monitored. Japanese Patent Application Laid-Open No. 2012-119804 discusses a technique by which a panoramic video image is generated such that a designated area within an entire image is centered if the panoramic video image is displayed.

However, a user sometimes finds it difficult to recognize a monitoring target. For example, if a display of an image is switched to a display of an entire image from a display of an image other than the entire image, a user may lose a monitoring target due to disagreement between an angle of a display area prior to the switch and an angle of the entire image.

SUMMARY OF THE INVENTION

The present invention is directed to, for example, a configuration below to display an observation target in a readily recognizable state if an image is displayed.

According to an aspect of the present invention, a display control apparatus includes a generation unit configured to generate, in a case where an area which is a part of a captured image captured using a fisheye lens is designated, a display image based on a position of the area designated in the captured image, the display image being an image in which the captured image is rotated about a predetermined position in the captured image so that a state of a subject included in the area becomes more erect, and a display control unit configured to cause the display image generated by the generation unit to be displayed on a display unit.

Further, the present invention is directed to, for example, a configuration below to display an observation target in a readily recognizable state if an image is displayed.

According to another aspect of the present invention, a display control apparatus includes a generation unit configured to generate, in a case where an area which is a part of a captured image captured using a fisheye lens is designated, a display image based on a position of the area designated in the captured image, the display image being an image in which the captured image is rotated about a predetermined position in the captured image as an axis and the captured image is rotated such that a position of the area moves in an upward direction, and a display control unit configured to cause the display image generated by the generation unit to be displayed on a display unit.

Furthermore, the present invention is directed to, for example, a configuration below to display an observation target in a readily recognizable state if an image is displayed.

According to yet another aspect of the present invention, a display control apparatus includes a generation unit configured to generate, in a case where an area which is a part of a captured image captured using a fisheye lens is designated, a display image based on a position of the area designated in the captured image, the display image being an image in which the captured image is rotated about a predetermined position in the captured image as an axis and the captured image is rotated such that a position of the area moves in a downward direction, and a display control unit configured to cause the display image generated by the generation unit to be displayed on a display unit.

Further features of the present invention will become apparent from the following description of exemplary embodiments with reference to the attached drawings.

BRIEF DESCRIPTION OF THE DRAWINGS

FIG. 3 is a sequence diagram illustrating display control processing.

DESCRIPTION OF THE EMBODIMENTS

Exemplary embodiments are hereinafter described with reference to the drawings.

Figure 1:
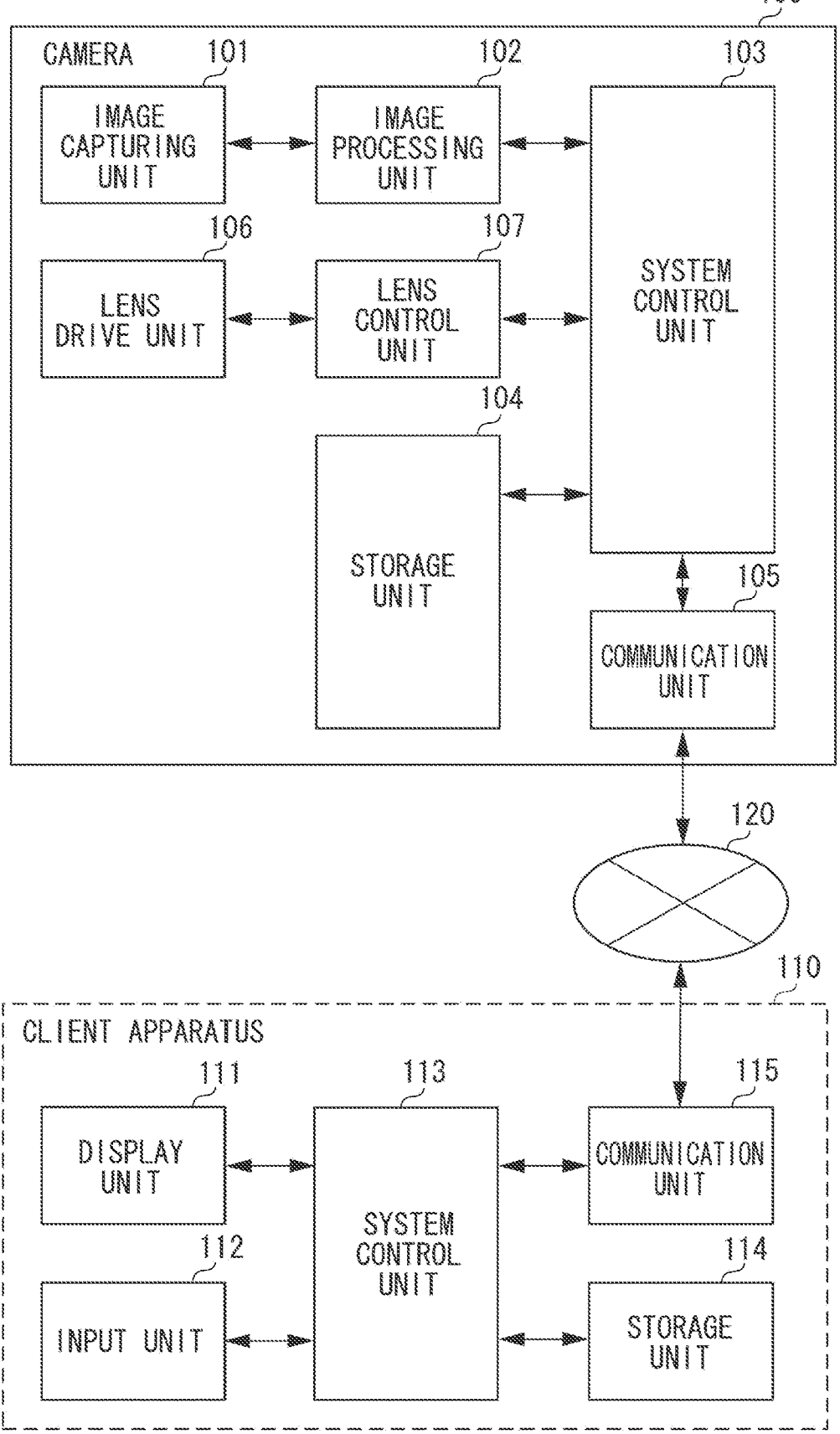
FIG. 1 is a diagram illustrating a hardware configuration of a display system.

FIG. 1 is a diagram illustrating a hardware configuration of a display system according to a first exemplary embodiment. The display system includes a camera 100 and a client apparatus 110. The camera 100 and the client apparatus 110 are connected with each other via a network 120 so that the camera 100 and the client apparatus 110 can communicate with each other. In the present exemplary embodiment, the camera 100 is an example of an image capturing apparatus. Although the camera 100 is a network camera, the camera 100 can be a camera that does not have a network function.

Moreover, in the present exemplary embodiment, the camera 100 is capable of capturing an omnidirectional image like a camera that captures an image by using a fisheye lens. The camera 100 is not necessarily capable of capturing an omnidirectional image as long as the camera 100 can capture a wider-angle image than an image captured by a camera having a general lens. The client apparatus 110 is a general-purpose computer such as a personal computer. Herein, the camera 100 and the client apparatus 110 is an example of a display control apparatus that controls a display of a captured image with respect to the client apparatus 110. Moreover, the client apparatus 110 is also an example of a display apparatus on which a captured image is displayed.

The camera 100 includes an image capturing unit 101, an image processing unit 102, a system control unit 103, a lens drive unit 106, a lens control unit 107, a storage unit 104, and a communication unit 105. The image capturing unit 101 includes a lens and an image sensor. The image capturing unit 101 captures an image of a subject, and converts the captured image into electric signals. The image processing unit 102 performs predetermined image processing on the signals of the image captured and photo-electrically converted by the image capturing unit 101 and compression coding processing to acquire a captured image. The captured image is an omnidirectional image.

The system control unit 103 includes a central processing unit (CPU) to comprehensively control the camera 100. The system control unit 103, for example, analyzes a received camera control command to perform processing according to the command. The system control unit 103, for example, issues a zoom instruction and a focus control instruction to the lens control unit 107. The storage unit 104 includes a read only memory (ROM) and a random access memory (RAM). The storage unit 104 stores various information and programs. The system control unit 103 reads a program stored in the storage unit 104 to execute the program, so that a function of and processing by the camera 100 described below are executed.

The communication unit 105 communicates with an external device via the network 120. The communication unit 105 delivers, for example, a captured image and angle information indicating a rotation angle to the client apparatus 110 via the network 120. Moreover, the communication unit 105 receives a camera control command that is transmitted from the client apparatus 110, and transmits the camera control command to the system control unit 103. The lens drive unit 106 includes a drive system for a lens group including a front lens, a focus lens, and a zoom lens, and a motor as a drive source of the drive system. An operation of the lens drive unit 106 is controlled by the lens control unit 107. In the present exemplary embodiment, the lens group to be driven by the lens drive unit 106 includes a fisheye lens. However, the lens group can include a wide-angle lens instead of the fisheye lens. Moreover, the zoom lens can be omitted. The lens control unit 107 controls the lens drive unit 106 based on the received instruction.

The client apparatus 110 includes a display unit 111, an input unit 112, a system control unit 113, a storage unit 114, and a communication unit 115. The display unit 111 is, for example, a liquid crystal display device, and displays an image acquired from the camera 100 and a graphical user interface (GUI) for camera control. The input unit 112 is, for example, a keyboard and a pointing device such as a mouse. A user of the client apparatus 110 operates the GUI via the input unit 112. The communication unit 115 communicates with an external device via the network 120. The communication unit 115 receives, for example, a captured image and angle information from the camera 100 via the network 120.

The system control unit 113 includes a CPU to comprehensively control the client apparatus 110. The system control unit 113, for example, generates a camera control command according to a user operation. The camera control command generated by the system control unit 113 is transmitted to the camera 100 via the communication unit 115. The storage unit 114 includes a ROM and RAM to store various information and programs. The system control unit 113 reads a program stored in the storage unit 114 to execute the program, so that a function of and processing by the client apparatus 110 described below are performed. Such a client apparatus 110 can acquire a captured image from the camera 100 and perform various camera control via the network 120.

Figure 2:
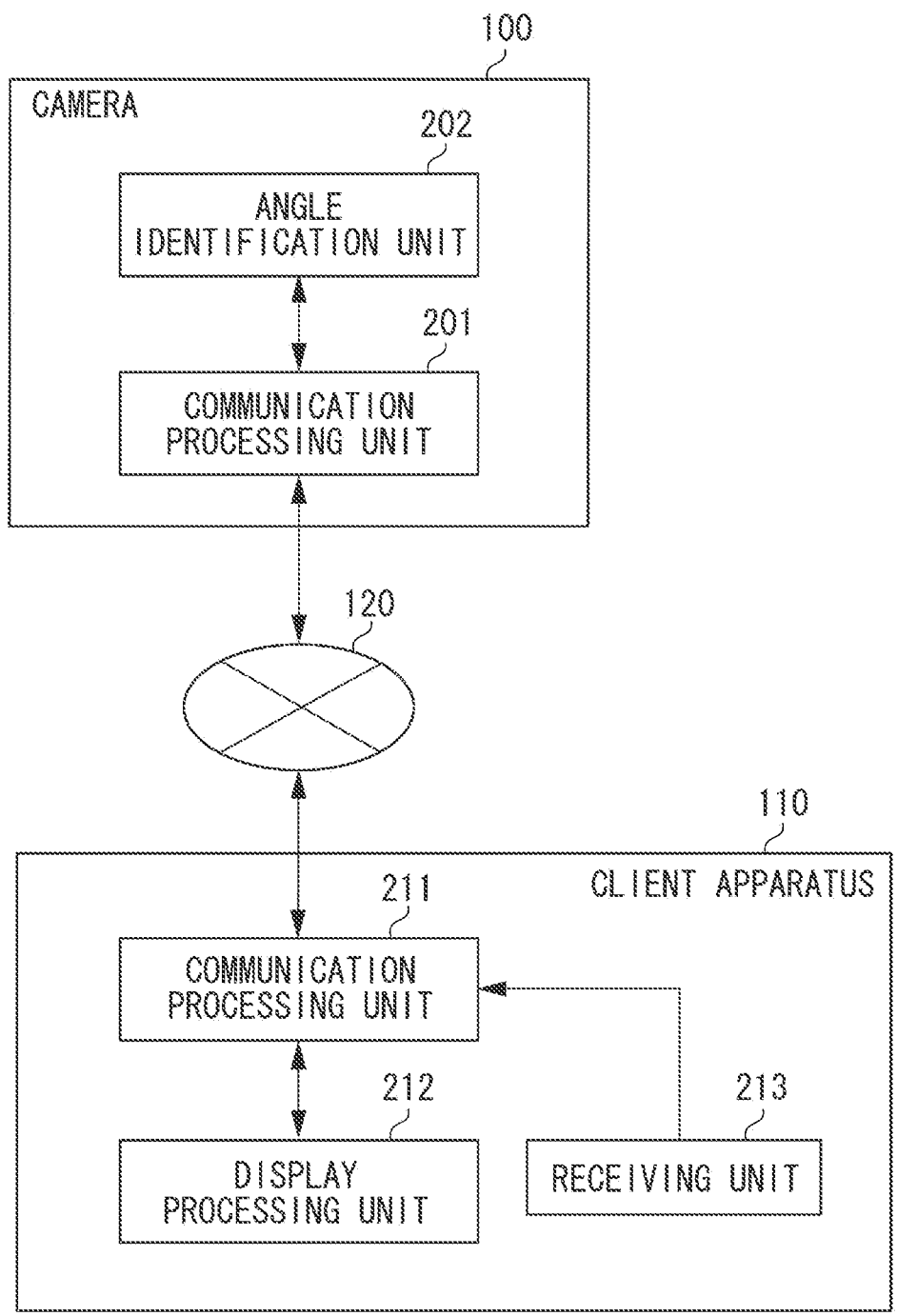
FIG. 2 is a diagram illustrating a functional configuration of the display system.

FIG. 2 is a diagram illustrating a functional configuration of a display system. The camera 100 includes a communication processing unit 201 and an angle identification unit 202. The communication processing unit 201 controls transmission and receipt of data to and from the client apparatus 110. The communication processing unit 201, for example, transmits the captured image acquired by the image capturing unit 101 to the client apparatus 110. Moreover, the communication processing unit 201 receives area information from the client apparatus 110. Herein, the area information represents information that designates one area of the captured image. The one area is selected according to a user operation performed in the client apparatus 110. Hereinafter, such an area selected according to the user operation is referred to as a selected area. The selected area can be an area to be cut out, or an area to be a target of video image analysis. Moreover, the selected area can be an area in which a detection target such as a moving object and a human figure has been detected by video image analysis, instead of the area selected according to the user operation. That is, the selected area can be an area designated by a video image analysis unit (not illustrated) that provides a video image analysis function. The angle identification unit 202 identifies coordinates of the selected area according to area designation information. Then, the angle identification unit 202 determines a rotation angle based on a position of the selected area. Herein, the term "rotation angle" represents an angle that is used for rotation of an entire captured image including the selected area in a case where the entire captured image is displayed. Such processing is described in detail below. The angle information indicating the rotation angle is transmitted to the client apparatus 110 via the communication processing unit 201.

The client apparatus 110 includes a communication processing unit 211, a display processing unit 212, and a receiving unit 213. The communication processing unit 211 controls transmission and receipt of data to and from the camera 100. The communication processing unit 211 receives, for example, a captured image and rotation angle information. The display processing unit 212 performs control such that various data is displayed on the display unit 111. The display processing unit 212, for example, performs control such that a captured image is rotated according to a rotation angle received by the communication processing unit 211 to display a post-rotation captured image on the display unit 111. That is, the display processing unit 212 generates a captured image rotated according to the received rotation angle to display such a rotated captured-image.

Figure 4A:
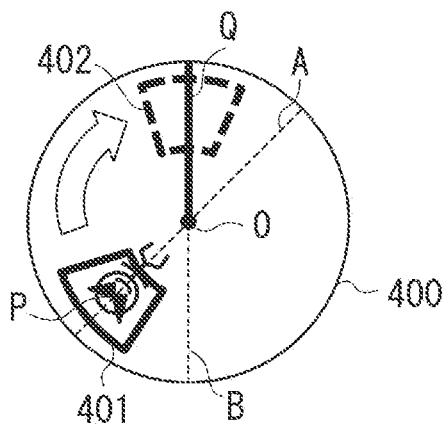
FIGS. 4A, 4B, and 4C are diagrams each illustrating the display control processing.
Figure 4B:
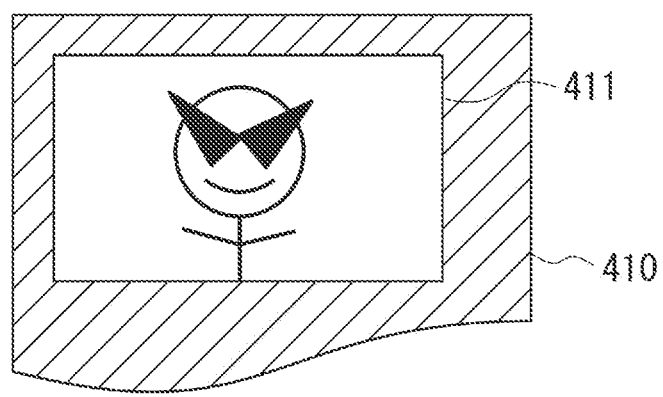
Figure 4C:
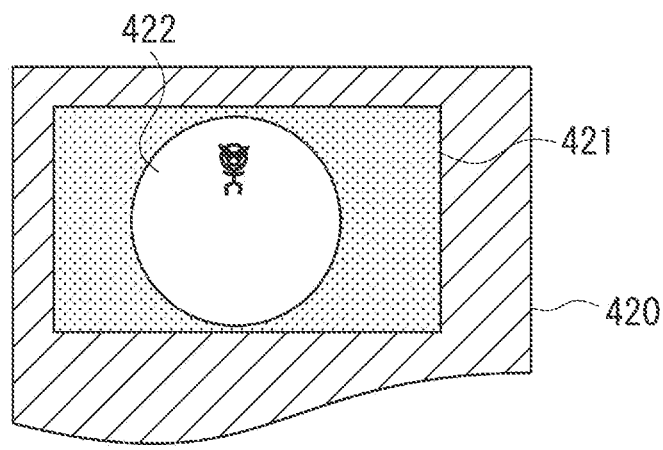

FIG. 3 is a sequence diagram illustrating display control processing performed by the display system. FIGS. 4A, 4B, and 4C are diagrams of the display control processing. Herein, the display control processing is described using an example in which a captured image is an omnidirectional image as illustrated in FIG. 4A. A captured image 400 illustrated in FIG. 4A is an image with a human figure as a subject captured by the camera 100 arranged on a ceiling. Since the camera 100 uses a fisheye lens, the captured image 400 has a circular imaging range. If one area of the captured image is selected, the display processing unit 212 of the client apparatus 110 performs dewarping (distortion correction) with respect to the selected area to provide the captured image acquired using the fisheye lens as an image of normal appearance, and displays the dewarped image. FIG. 4B illustrates an example of a GUI 410 in which an area image 411 corresponding to a selected area 401 illustrated in FIG. 4A is displayed. The area image 411 is a dewarped image of the selected area 401 (FIG. 4A).

In step S301 of the flowchart illustrated in FIG. 3, if a predetermined user operation is performed, the communication processing unit 211 of the client apparatus 110 transmits area information to the camera 100. Herein, the predetermined user operation includes an operation for linking a selected area to an entire captured image in a case where an operation for switching a display target on the display unit 111 from an area image to an entire captured image is performed. In step S302, when the communication processing unit 201 of the camera 100 receives the area information, the angle identification unit 202 of the camera 100 acquires coordinates of the selected area in the captured image based on the area information. The coordinates are stored in the storage unit 104. Subsequently, in step S303, the angle identification unit 202 identifies a center line of the selected area based on the coordinates of the selected area and a center position of the captured image. In the captured image 400 illustrated in FIG. 4A, a line A connecting a center position O of the captured image 400 and a center position P of the selected area 401 is identified as a center line of the selected area 401. A position of the center position O is set beforehand according to a shape of the captured image.

Subsequently, in step S304, the angle identification unit 202 acquires coordinates of a display position. Herein, the display position is set beforehand and stored in the storage unit 104. In the present exemplary embodiment, a position on a line segment Q illustrated in FIG. 4A is set as the display position. The camera 100 may be arranged on a ceiling. In such a case, a human figure present below the camera 100 is a subject. Thus, the human figure as the subject is often captured such that the top of the human figure is arranged closer to a contour of an imaging range and the bottom of the human figure is arranged closer to the center of the imaging range. Accordingly, in the present exemplary embodiment, as illustrated in FIG. 4A, a position on the line segment Q that is arranged on an upper side relative to the center position O out of lines that pass the center position O within the captured image and are parallel to a vertical direction of the captured image is set as a display position. In the display position, the vertical direction of the captured image corresponds to a vertical direction of the subject appearing on the selected area, and a human figure to be displayed in a range including the display position seems to be erect (i.e., in an upright position or orientation). In the storage unit 104, position information indicating the line segment Q is stored as the display position.

In steps S302 through S306, a rotation angle for rotation of the entire captured image is determined such that the center of the selected area 401 is positioned in the display position (on the line segment Q). In the example illustrated in FIG. 4A, the selected area 401 is moved, and then becomes an area 402. Subsequent to step S304, in step S305, the angle identification unit 202 identifies a center line of the display position. In the captured image 400 illustrated in FIG. 4A, a line B connecting the center position O of the captured image 400 and the display position is identified as a center line of the display position. Next, in step S306, the angle identification unit 202 determines an angle between the center line of the selected area and the center line of the display position as a rotation angle. This processing identifies a rotation angle for rotation from a position of the selected area to the display position, and is an example of angle identification processing.

Subsequently, in step S307, the communication processing unit 201 transmits angle information indicating the rotation angle determined in the step S306 and the captured image to the client apparatus 110. In step S308, when the communication processing unit 211 of the client apparatus 110 receives the captured image and the angle information, the display processing unit 212 of the client apparatus 110 rotates the captured image by only the rotation angle indicated by the angle information. This processing is an example of rotation processing for rotating a captured image according to a rotation angle. The rotation processing generates a rotated captured-image, and causes the rotated captured-image to be displayed. As for a method for generating a rotated captured-image, various image processing techniques can be used. In step S309, the display processing unit 212 performs control such that the post-rotation captured-image is displayed on the display unit 111. Then, the processing ends.

FIG. 4C illustrates an example of a GUI 420 in which a post-rotation entire captured image is displayed. The GUI 420 includes a display area 421, and a post-rotation captured image 422 is displayed in the display area 421. Since the captured image 422 has been rotated such that the selected area 401 moves from the state illustrated in FIG. 4A to the display position, a human figure appearing in the selected area 401 is erect. Accordingly, a user can readily recognize a position of an observation target even if a display on the display unit 111 is switched from the area image 411 illustrated in 4B to the entire captured image.

In the present exemplary embodiment, a captured image is rotated such that a selected area is positioned in a display position. However, the selected area may not be precisely positioned in the display position. The selected area can be displayed at an angle with which a user can recognize that a subject in an area image is erect. From such a standpoint, an angle by which the captured image is actually rotated can be in a predetermined angle range with reference to a rotation angle to the display position.

Accordingly, in the display system according to the present exemplary embodiment, rotation of a selected area to a display position enables a captured image to be displayed in a state in which a subject appearing in the selected area is erect. That is, in a case where the display system displays an image, an observation target can be displayed in a readily recognizable state.

Figure 5A:
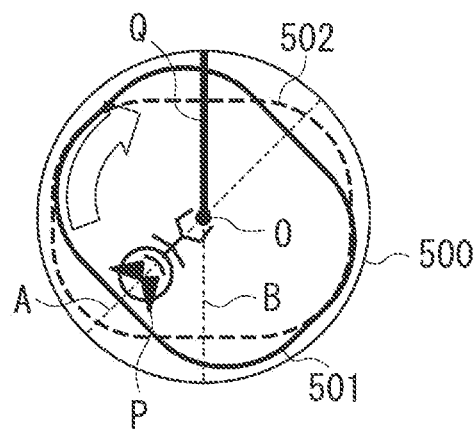
FIGS. 5A, 5B, and 5C are diagrams each illustrating a modification example.
Figure 5B:
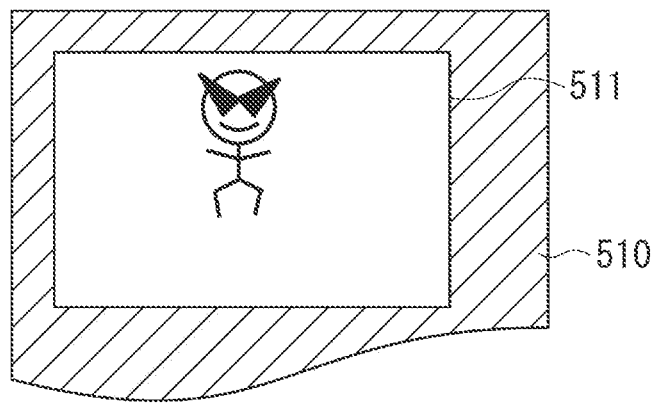
Figure 5C:
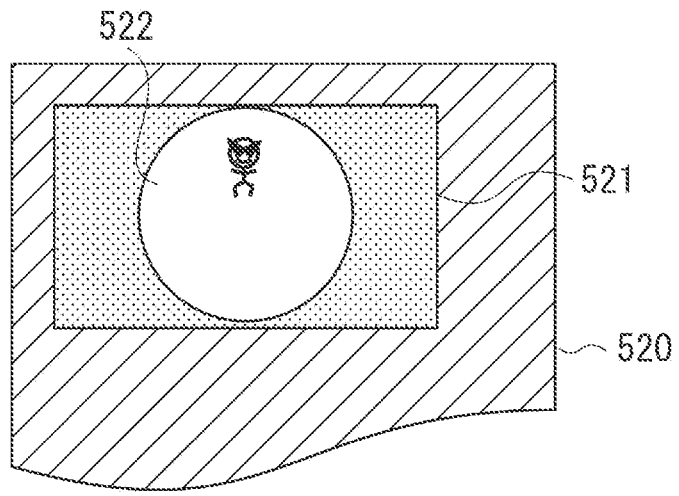

In a first modification example of the first exemplary embodiment, a captured image is not limited to that described in the first exemplary embodiment. For example, the captured image can be a panoramic image, as illustrated in FIGS. 5A, 5B, and 5C, captured by a camera capable of capturing an omnidirectional image. A captured image 500 illustrated in FIG. 5A is a panoramic image. In this case, a camera 100 is arranged on a ceiling. That is, the camera 100 is arranged so as to capture an image in a downward direction. The downward direction represents a direction substantially the same as the direction of gravity. FIG. 5B is a diagram illustrating an example of a GUI 510 in which an area image 511 corresponding to a selected area 501 of the captured image 500 is displayed. Since the captured image in the present modification example is a panoramic image captured by the camera 100 arranged on the ceiling, a human figure to be a subject is often captured such that the top of the human figure is arranged closer to a contour of an imaging range and the bottom of the human figure is arranged closer to the center of the imaging range as similar to the aforementioned exemplary embodiment. Accordingly, similar to the aforementioned exemplary embodiment, in the present modification example as illustrated in FIG. 5A, a position on a line segment Q that is arranged on an upper side relative to a center position O out of lines that pass the center position O within a captured image and are parallel to a vertical direction of the captured image is set as a display position. In the example illustrated in FIG. 5A, a selected area 501 is moved, and then becomes an area 502. Accordingly, the captured image is rotated such that a position of the selected area moves in an upward direction.

Then, the angle identification unit 202 identifies a line A connecting the center position O of the captured image 500 and a center position P of the selected area 501 as a center line of the selected area 501. Moreover, the angle identification unit 202 identifies a line B connecting the center position O and a display position as a center line of the display position. FIG. 5C illustrates an example of a GUI 520 in which a post-rotation entire captured image is displayed. The GUI 520 includes a display area 521, and a post-rotation captured image 522 is displayed in the display area 521.

Figure 6A:
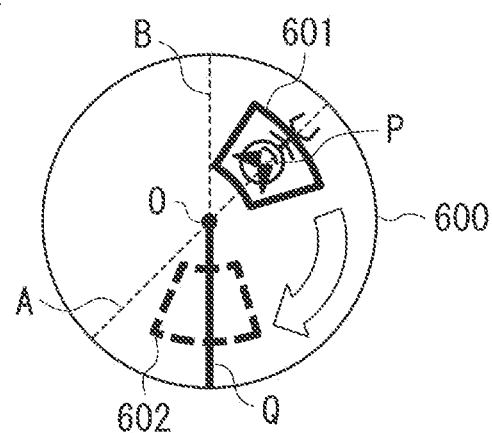
FIGS. 6A, 6B, and 6C are diagrams each illustrating a modification example.
Figure 6B:
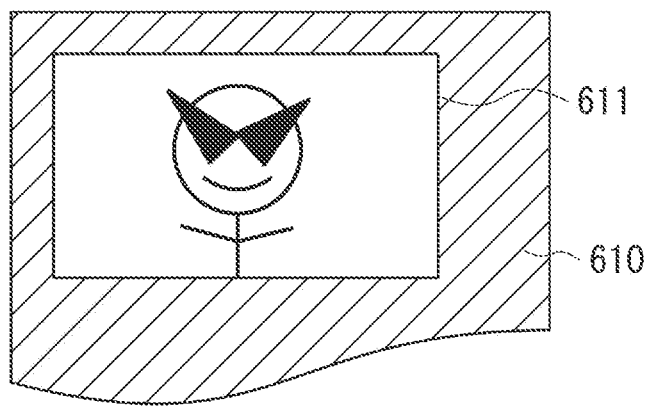

In a second modification example, a display position is not limited to that described in the exemplary embodiment. The second modification example is described with reference to FIGS. 6A, 6B, and 6C. A captured image 600 illustrated in FIG. 6A is an omnidirectional image captured by a camera 100 arranged on a desk. That is, the camera 100 is arranged to capture an image in an upward direction. The upward direction represents a direction substantially opposite the direction of gravity. FIG. 6B illustrates an example of a GUI 610 in which an area image 611 corresponding to a selected area 601 of a captured image 600 is displayed. In the second modification example, since the camera 100 is arranged on the desk, for example, a human figure present around the camera 100 so as to surround the desk is a subject. Thus, the human figure to be the subject is often captured such that the top of the human figure is arranged closer to the center of an imaging range and the bottom of the human figure is arranged closer to a contour of the imaging range. Accordingly, in the second modification example as illustrated in FIG. 6A, a position on a line segment Q that is arranged on a lower side relative to a center position O out of lines that pass the center position O within the captured image and are parallel to a vertical direction of the captured image is set as a display position. After the selected area 601 is moved, a human figure displayed in a range of the area 602 including the display position seems to be erect. In the storage unit 104, position information indicating the line segment Q is stored as a display position. Accordingly, the captured image is rotated such that a position of the selected area moves in a downward direction.

Figure 6C:
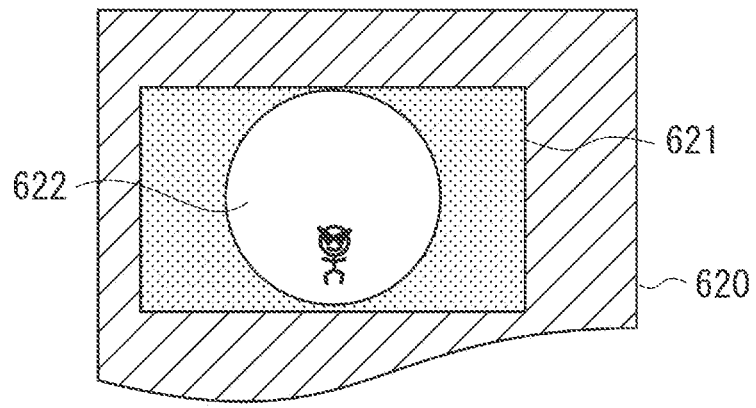

The angle identification unit 202 identifies a line A connecting the center position O of the captured image 600 and a center position P of the selected area 601 as a center line of the selected area 601. Moreover, the angle identification unit 202 identifies a line B connecting the center position O and a display position as a center line of the display position. Then, the angle identification unit 202 determines a rotation angle. The display processing unit 212 of the client apparatus 110 rotates the captured image by only the rotation angle. In the example illustrated in FIG. 6A, the selected area 601 moves to the area 602. FIG. 6C illustrates an example of a GUI 620 in which a post-rotation entire captured image is displayed. The GUI 620 includes a display area 621, and a post-rotation captured image 622 is displayed in the display area 621. Accordingly, an appropriate position can be set beforehand as a display position according to the captured image.

Figure 7A:
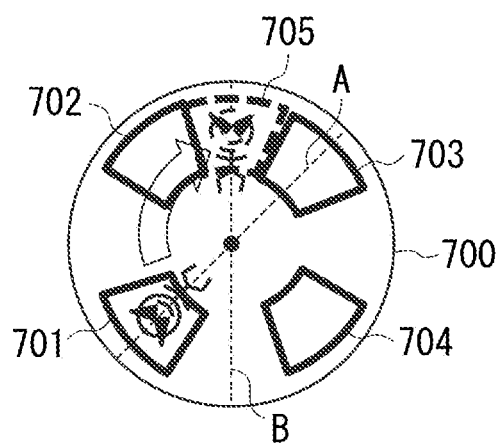
FIGS. 7A, 7B, and 7C are diagrams each illustrating a modification example.
Figure 7B:
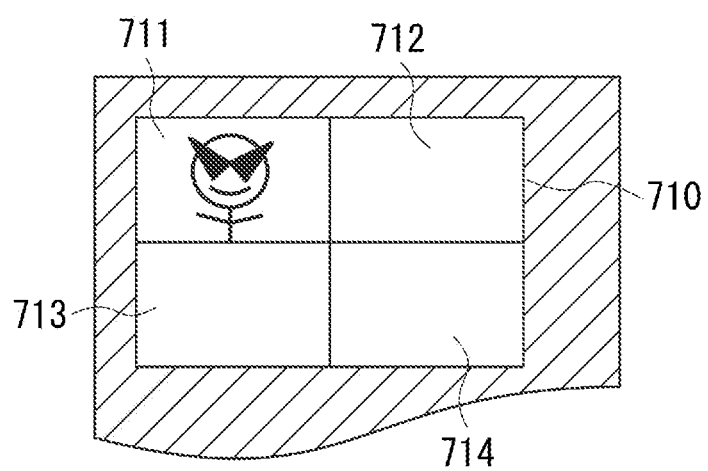

In a third modification example, a plurality of selected areas can be provided. FIG. 7A illustrates a captured image 700. The captured image 700 is substantially the same as the captured image 400 described above with reference to FIG. 4A. In the third modification example, a plurality of selected areas 701 through 704 of the captured image 700 is cut out, and four area images 711 through 714 are displayed in a GUI 710 as illustrated in FIG. 7B. The area images 711 through 714 respectively correspond to the selected areas 701 through 704 illustrated in FIG. 7A.

Figure 7C:
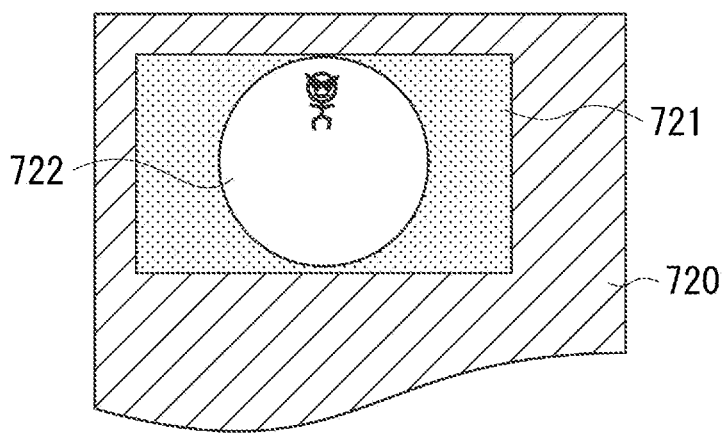

In the third modification example, the angle identification unit 202 selects one selected area that is set beforehand from the plurality of selected areas as a processing target. Examples of the selected area which is set beforehand include a selected area that is first selected, and a selected area displayed in a predetermined position of the GUI 710. The angle identification unit 202 identifies a rotation angle such that the selected area of the processing target is moved to the area 705 including the display position. FIG. 7C illustrates an example of a GUI 720 in which a post-rotation entire captured image is displayed. The GUI 720 includes a display area 721, and a post-rotation captured image 722 is displayed in the display area 721. Accordingly, if the entire captured image is to be displayed, the display processing unit 212 performs control such that the captured image 722 is displayed in a state in which the selected area 701 of the processing target is positioned in the display position. In another example, the angle identification unit 202 can select one selected area designated by a user as a processing target instead of the selected area which is set beforehand.

Figure 8A:
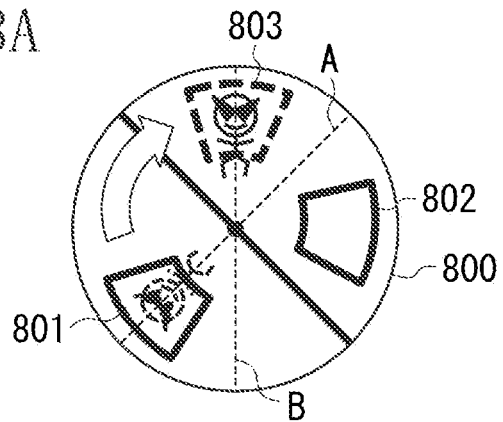
FIGS. 8A, 8B, and 8C are diagrams each illustrating a modification example.
Figure 8B:
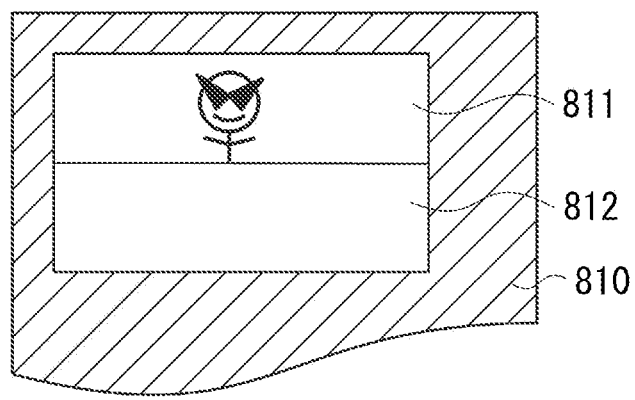
Figure 8C:
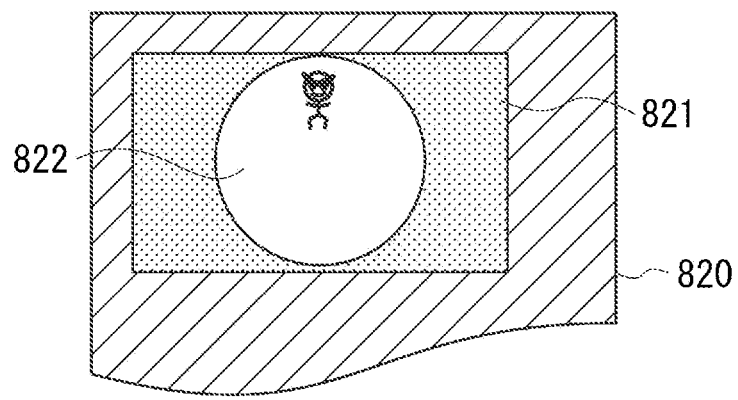

Moreover, as illustrated in FIGS. 8A, 8B, and 8C, a captured image may be a panoramic image, and two area images respectively corresponding to two selected areas may be displayed in a GUI. Even in such a case, the angle identification unit 202 can select one selected area as a processing target. As illustrated in FIG. 8B, area images 811 and 812 respectively corresponding to selected areas 801 and 802 of a captured image 800 illustrated in FIG. 8A are displayed in a GUI 810. Herein, the captured image 800 illustrated in FIG. 8A is substantially the same as the captured image 400 described above with reference to FIG. 4A. Herein, for example, if the selected area 801 is selected as a processing target, a captured image 822 rotated such that the selected area 801 is positioned in the area 803 is displayed in a GUI 820 as illustrated in FIG. 8C.

Figure 9:
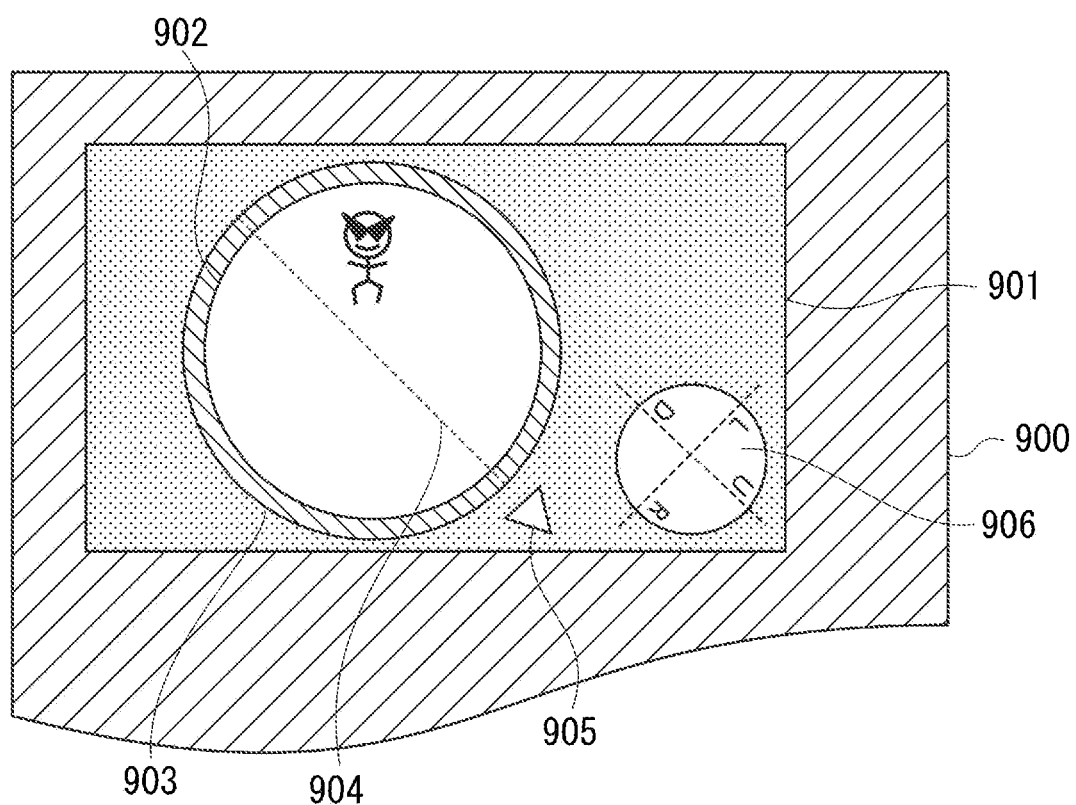
FIG. 9 is a diagram illustrating a modification example.

In a fourth modification example, the display processing unit 212 of the client apparatus 110 can display a post-rotation entire captured image and a guide indicating information that the captured image has been rotated. FIG. 9 is a diagram illustrating a display example of the guide. In FIG.

9, a GUI 900 includes a display area 901 for display of a captured image, a captured image 902 displayed in the display area 901, and guide user interfaces (UIs) 903 and 904 that notify a user that the captured image has been rotated. Moreover, the GUI 900 includes a guide UI 905 that indicates an upward direction of a pre-rotation captured image, and a guide UI 906. Similar to the guide UIs 903, 904, and 905, the guide UI 906 indicates how far the captured image has been rotated. Accordingly, indication of a relationship between the pre-rotation captured image and the post-rotation captured image enables the user to recognize states prior to and subsequent to the rotation. The information to be displayed with the entire captured image can be information about rotation. Such information includes information indicating that a captured image has been rotated, and information indicating a rotation angle, in addition to the information indicating the position of the pre-rotation captured image and the information indicating how far the rotation has been made.

In a fifth modification example, a camera 100 can perform processing for rotating a captured image. That is, after determining a rotation angle, the camera 100 rotates a captured image at the rotation angle, and transmits the post-rotation captured image to the client apparatus 110. In such a case, the client apparatus 110 can display the post-rotation captured image on the display unit 111 by simply displaying the received captured image.

Figure 10:
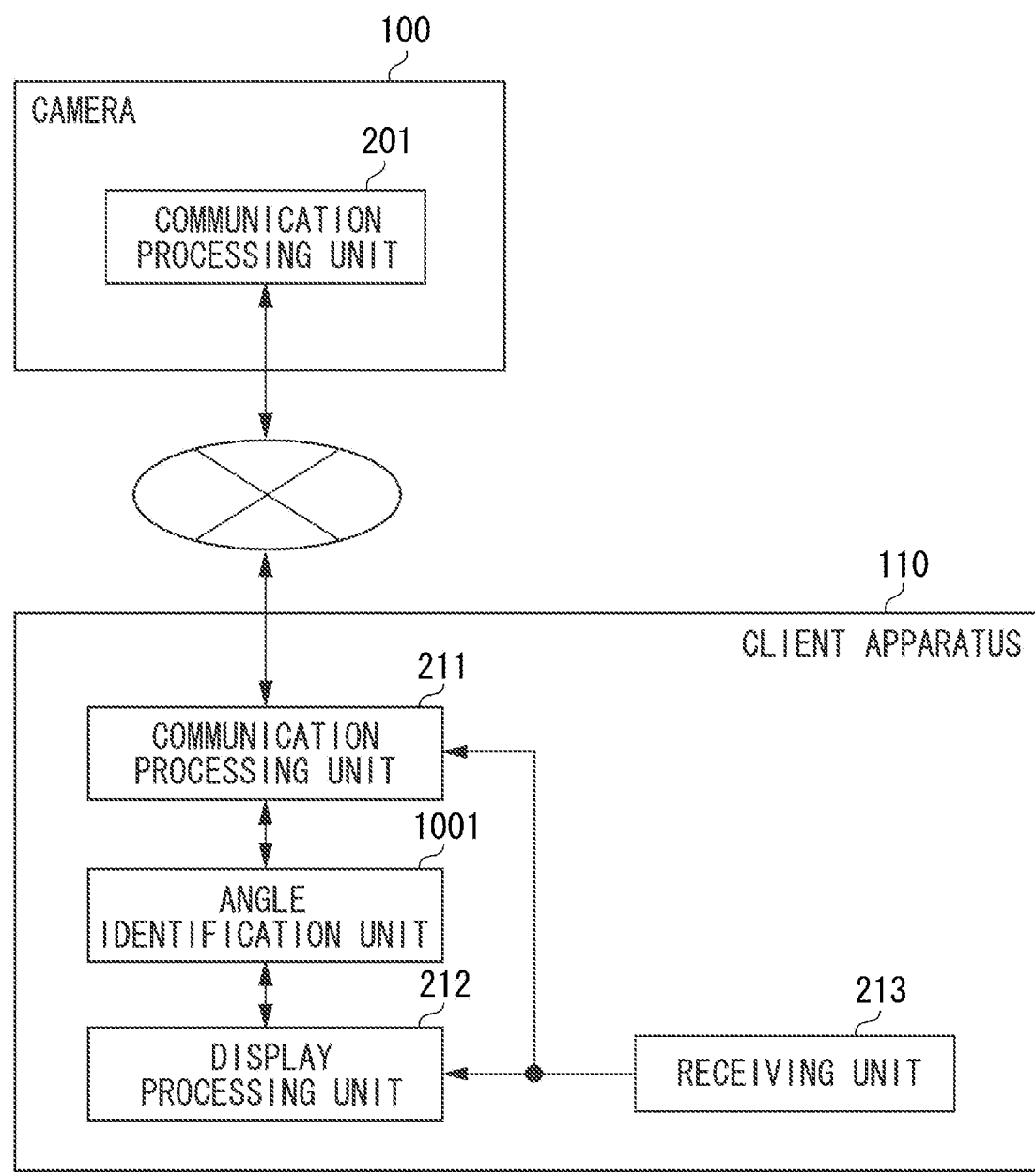
FIG. 10 is a diagram illustrating a functional configuration of a display system according to a second exemplary embodiment.
Figure 11:
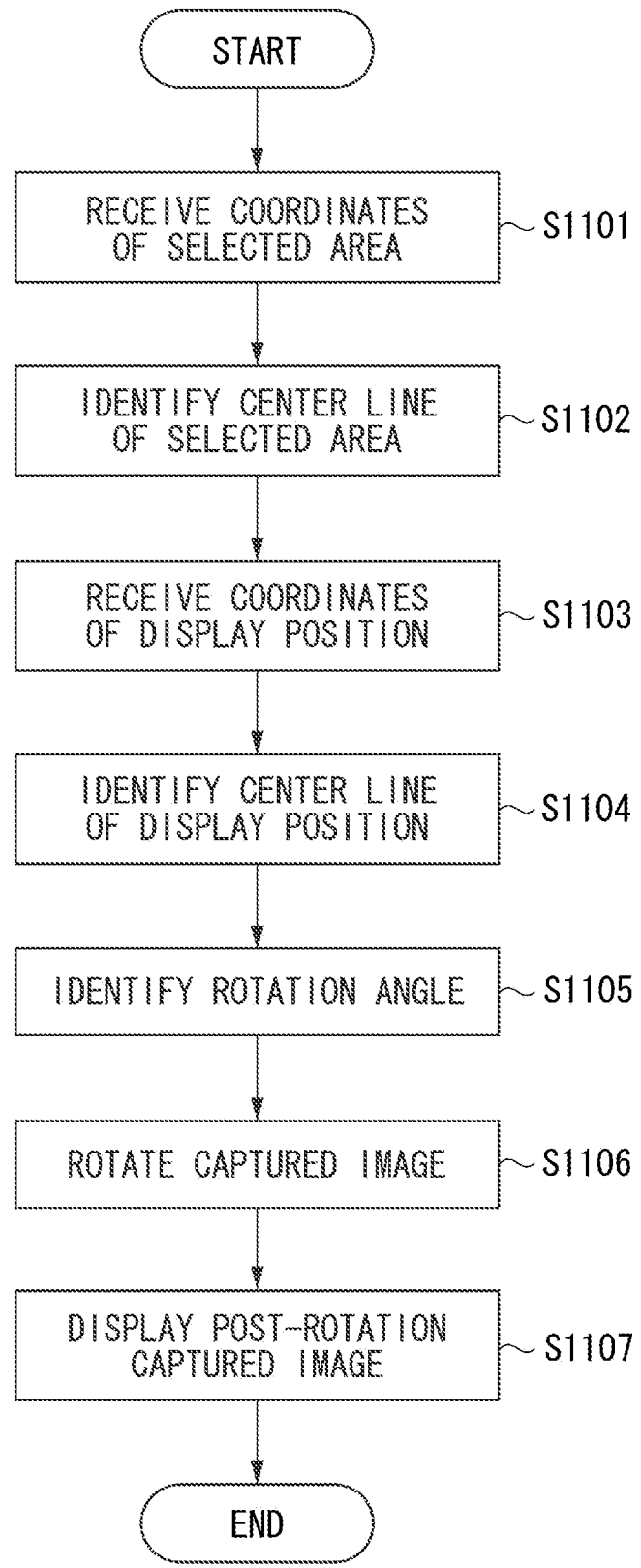
FIG. 11 is a flowchart illustrating display control processing according to the second exemplary embodiment.

In a display system according to a second exemplary embodiment, a client apparatus 110 identifies a rotation angle. Hereinafter, a description is given mainly of differences between the display system according to the second exemplary embodiment and the display system according to the first exemplary embodiment. FIG. 10 is a diagram illustrating a functional configuration of the display system according to the second exemplary embodiment. In the second exemplary embodiment, the client apparatus 110 includes an angle identification unit 1001. FIG. 11 is a flowchart illustrating display control processing performed by the client apparatus 110 according to the second exemplary embodiment. The client apparatus 110 starts the display control processing if an operation for linking a selected area to the entire captured image is performed, for example, if an operation for switching a display target on a display unit 111 from an area image to the entire captured image is performed.

In step S1101, a communication processing unit 211 receives coordinates of a selected area from a camera 100 via a network 120. The coordinates of the selected area are stored in a storage unit 104 of the camera 100. In step S1102, the angle identification unit 1001 identifies a center line of the selected area based on the coordinates of the selected area and a center position of the captured image. This processing is similar to that in step S303 of the flowchart illustrated in FIG. 3. Subsequently, in step S1103, the communication processing unit 211 receives coordinates of a display position stored in the storage unit 104 from the camera 100. Subsequently, in step S1104, the angle identification unit 1001 identifies a center line of the display position. This processing is similar to that in step S305 of the flowchart illustrated in FIG. 3. In step S1105, the angle identification unit 1001 determines a rotation angle. This processing is similar to that in step S306 of the flowchart illustrated in FIG. 3. Subsequent processing in steps S1106 and S1107 is similar to the processing in the respective steps S308 and S309 of the flowchart illustrated in FIG. 3. Configurations and processing other than these of the display system according to the second exemplary embodiment are similar to the configurations and the processing of the display system according to the first exemplary embodiment.

Therefore, in the display system according to the second exemplary embodiment, rotation of a selected area to a display position enables a captured image to be displayed in a state in which a subject to appear in the selected area is erect.

Figure 12:
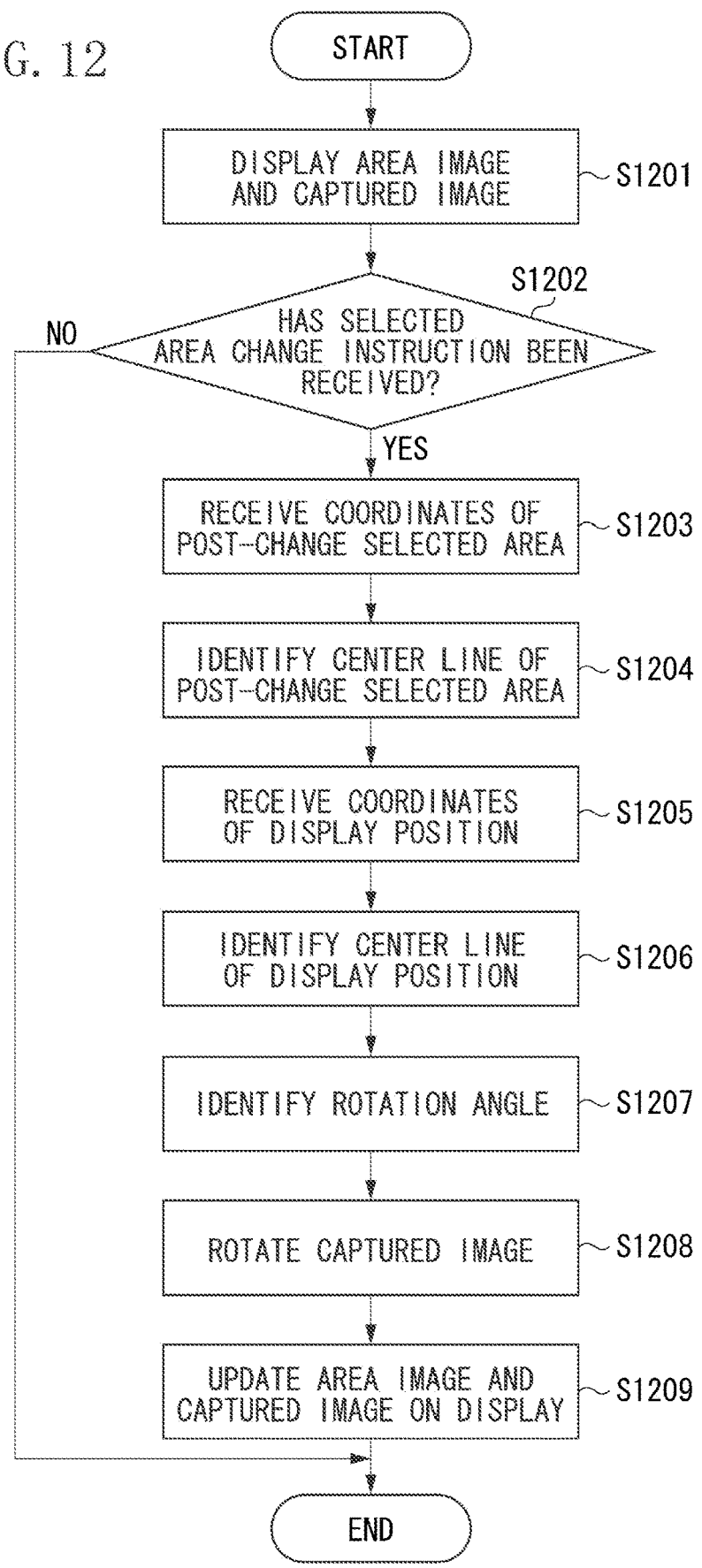
FIG. 12 is a flowchart illustrating display control processing according to a third exemplary embodiment.
Figure 13A:
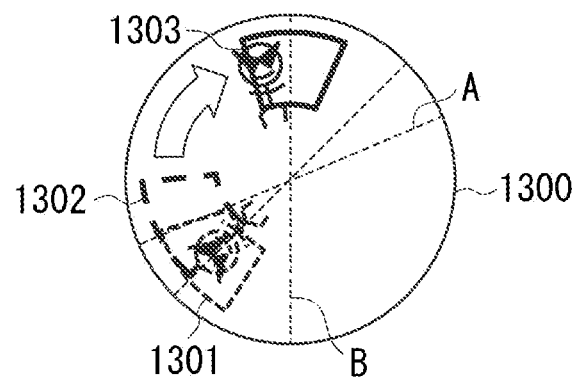
FIGS. 13A, 13B, and 13C are diagrams each illustrating the display control processing.
Figure 13B:
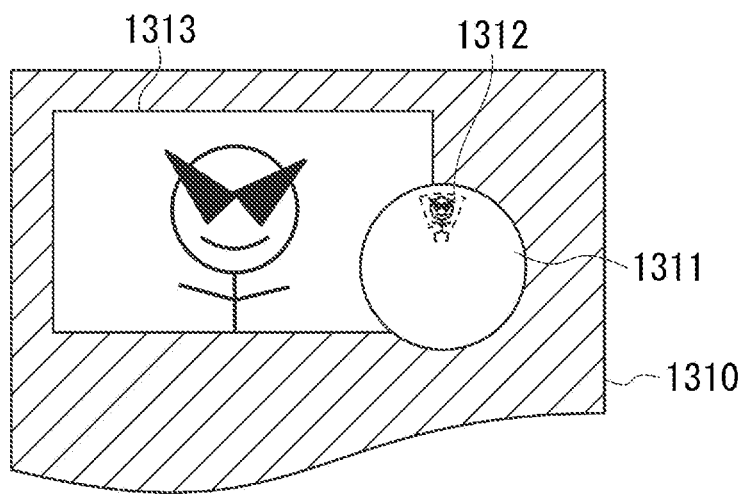
Figure 13C:
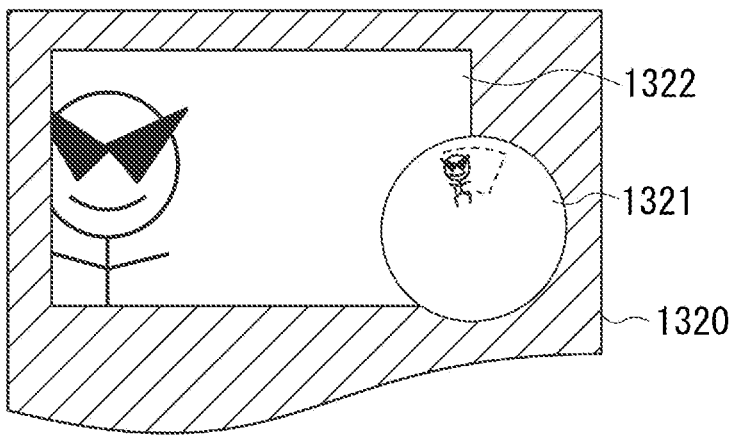

In a display system of a third exemplary embodiment, a client apparatus 110 identifies a rotation angle, as similar to the display system according to the second exemplary embodiment. Hereinafter, a description is given mainly of differences between the display system according to the third exemplary embodiment and the display system according to the second exemplary embodiment. FIG. 12 is a flowchart illustrating display control processing performed by the client apparatus 110 according to the third exemplary embodiment. FIGS. 13A, 13B, and 13C are diagrams illustrating the display control processing. A captured image 1300 illustrated in FIG. 13A is substantially the same as the captured image 400 illustrated in FIG. 4A.

In step S1201 of the flowchart illustrated in FIG. 12, a display processing unit 212 performs control such that an area image indicating a selected area and a post-rotation entire captured image are displayed at the same time on a display unit 111. Herein, the post-rotation entire captured image is provided by rotation of a captured image such that the selected area is positioned in a display position. The client apparatus 110 rotates the captured image by performing steps S1101 through S1106 of the flowchart illustrated in FIG. 11 so that the entire captured image is displayed. FIG. 13B is a diagram illustrating an example of a GUI 1310 in which an area image 1313 and a captured image 1311 displayed by the processing in step S1201 are displayed. An area 1312 of the captured image 1311 corresponds to a selected area 1301 illustrated in FIG. 13A. Moreover, the captured image 1311 is provided by rotation of the selected area 1301 illustrated in FIG. 13A to the area 1303 including a display position. Accordingly, the area image 1313 and the captured image 1311 corresponding to the area image 1313 are displayed on the display unit 111. Moreover, the captured image 1311 is displayed in a state in which a human figure in the selected area 1301 is rotated so as to be erect.

Next, in step S1202, a receiving unit 213 checks whether the receiving unit 213 has received a selected area change instruction. In a case where the receiving unit 213 has received the change instruction (YES in step S1202), the processing proceeds to step S1203. In a case where the receiving unit 213 has not received the change instruction (NO in step S1202), the processing ends. In step S1203, the communication processing unit 211 receives coordinates of the selected area related to the change instruction. Next, in step S1204, the communication processing unit 211 identifies a center line of a post-change selected area. This processing is similar to that in step S1101 of the flowchart illustrated in FIG. 11 (step S303 of the flowchart illustrated in FIG. 3).

Subsequent processing in steps S1205 and S1206 are similar to the processing in the respective steps S1103 and S1104 of the flowchart illustrated in FIG. 11. After the processing in step S1206, the operation proceeds to step S1207. In step S1207, an angle identification unit 1001 determines an angle between a center line of the post-change selected area and a center line of a display position as a rotation angle. Then, in step S1208, the display processing unit 212 rotates a pre-rotation captured image at the rotation angle. In step S1209, the display processing unit 212 performs control such that a post-rotation captured image is displayed on the display unit 111.

For example, a change instruction for changing a selected area from the area 1301 to an area 1302 illustrated in FIG. 13A may be received in a state in which the GUI 1310 illustrated in FIG. 13B is being displayed. In such a case, the angle identification unit 1001 identifies a center line A corresponding to the selected area 1302 to determine a rotation angle between the center line A and a center line B of a display position, and displays a captured image rotated at only the rotation angle and an area image of the selected area 1302. Thus, in a GUI 1320 as illustrated in FIG. 13C, the area image and the captured image are updated with the change of the selected area. In FIG. 13C, an area image 1322 corresponds to the selected area 1302, and a captured image 1321 is updated to an image that is rotated such that the selected area 1302 is positioned in a display position. Configurations and processing other than these of the display system according to the third exemplary embodiment are similar to the configurations and the processing of the display system according to the second exemplary embodiment.

The display system according to the third exemplary embodiment can display a captured image in a state in which a subject relating to a selected area is erect even if the entire capture image and an area image are displayed at the same time. Moreover, in a case where the selected area is changed, the display system can display the captured image in a state in which a subject relating to the post-change selected area is erect.

The present invention has been described in detail with reference to exemplary embodiments. However, the present invention is not limited thereto. Various modifications and enhancements are possible without departing from scope of the disclosure.

Aspects of the present invention can be achieved by an operation in which a program for performing one or more functions of the above exemplary embodiment is supplied to a system or an apparatus via a network or a storage medium, and one or more processors in a computer of the system or apparatus reads and executes the program. Moreover, aspects of the present invention can be achieved by a circuit (e.g., application specific integrated circuit (ASIC)) for performing one or more functions.

According to each of the exemplary embodiments, in a case where an image is displayed, an observation target can be displayed in a readily recognizable state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-103649, filed May 25, 2017, which is hereby incorporated by reference herein in its entirety.

What is claimed is:

1. A display control apparatus comprising a computer executing instructions that, when executed by the computer, cause the computer to function as:

a determination unit configured to determine a rotation angle for rotating an omnidirectional image captured using a fisheye lens so that a position of a designated area in the omnidirectional image is located at a predetermined display position, based on the position of the designated area and a position of the predetermined display position, the designated area being for cutting out a partial image corresponding to the designated area from the omnidirectional image; and a display control unit configured to cause a display unit to display the partial image corresponding to the designated area and cut out from the omnidirectional image, and the omnidirectional image rotated by the rotation angle, wherein, in a case where a change instruction for changing the position of the designated area in the omnidirectional image is received, the determination unit further determines a rotation angle based on a position of the designated area changed in response to the change instruction and the position of the predetermined display position, wherein the display control unit updates the omnidirectional image to an omnidirectional image being rotated by the rotation angle based on the position of the designated area changed in response to the change instruction and the position of the predetermined display position, and updates the partial image to a partial image corresponding to the designated area changed in response to the change instruction, wherein the display control unit causes the display unit to display the partial image rotated so that a subject in the partial image is in an upright orientation and the omnidirectional image rotated by the rotation angle so that the subject in the omnidirectional image is in an upright orientation at the predetermined display position, and wherein the predetermined display position is in a region above a central position of the omnidirectional image and at a center of the region.

2. The display control apparatus according to claim 1, wherein, after the partial image is displayed, the display control unit controls the display unit to display the omnidirectional image being rotated by the rotation angle.

3. The display control apparatus according to claim 1, wherein the display control unit causes the partial image and the omnidirectional image being rotated by the rotation angle to be displayed at the same time on the display unit.

4. The display control apparatus according to claim 1, wherein, in a case where the omnidirectional image includes a plurality of designated areas, the determination unit determines the rotation angle based on a position of a predetermined designated area out of the plurality of designated areas.

5. The display control apparatus according to claim 1, wherein the display control unit causes the display unit to display information indicating how far the omnidirectional image is rotated.

6. The display control apparatus according to claim 1, wherein the display control unit controls to perform dewarping on the designated area of the omnidirectional image to generate the partial image.

7. The display control apparatus according to claim 1, wherein, in a case where a change instruction for changing the designated area is received while the partial image and the omnidirectional image are displayed, the determination unit further determines a rotation angle based on a position of designated area changed in response to the change.

8. A display control method comprising:
   determining a rotation angle for rotating an omnidirectional image captured using a fisheye lens so that a position of a designated area in the omnidirectional image is located at a predetermined display position, based on the position of the designated area and a position of the predetermined display position, the designated area being for cutting out a partial image corresponding to the designated area from the omnidirectional image; and
   displaying the partial image corresponding to the designated area and cut out from the omnidirectional image, and the omnidirectional image rotated by the rotation angle,
   wherein, in a case where a change instruction for changing the position of the designated area in the omnidirectional image is received, determine a rotation angle based on a position of the designated area changed in response to the change instruction and the position of the predetermined display position,
   wherein the omnidirectional image to an omnidirectional image being rotated by the rotation angle based on the position of the designated area changed in response to the change instruction and the position of the predetermined display position is updated and the partial image to a partial image corresponding to the designated area changed in response to the change instruction is updated,
   wherein the partial image is rotated and displayed so that a subject in the partial image is in an upright orientation and the omnidirectional image rotated by the rotation angle is displayed so that the subject is in an upright orientation at the predetermined display position, and
   wherein the predetermined display position is in a region above a central position of the omnidirectional image and at a center of the region.

9. A non-transitory computer-readable storage medium storing a program for causing a computer to function as:
   a determination unit configured to determine a rotation angle for rotating an omnidirectional image captured using a fisheye lens so that a position of a designated area in the omnidirectional image is located at a predetermined display position, based on the position of the designated area and a position of the predetermined display position, the designated area being for cutting out a partial image corresponding to the designated area from the omnidirectional image; and
   a display control unit configured to cause a display unit to display the partial image corresponding to the designated area and cut out from the omnidirectional image, and the omnidirectional image rotated by the rotation angle,
   wherein, in a case where a change instruction for changing the position of the designated area in the omnidirectional image is received, the determination unit further determines a rotation angle based on a position of the designated area changed in response to the change instruction and the position of the predetermined display position,
   wherein the display control unit updates the omnidirectional image to a omnidirectional image being rotated by the rotation angle based on the position of the designated area changed in response to the change instruction and the position of the predetermined display position, and updates the partial image to a partial image corresponding to the designated area changed in response to the change instruction,
   wherein the display control unit causes the display unit to display the partial image rotated so that a subject in the partial image is in an upright orientation and the omnidirectional image rotated by the rotation angle so that the subject in the omnidirectional image is in an upright orientation at the predetermined display position, and
   wherein the predetermined display position is in a region above a central position of the omnidirectional image and ay a center of the region.

10. A display control apparatus comprising a computer executing instructions that, when executed by the computer, cause the computer to function as:
    a determination unit configured to determine a rotation angle for rotating an omnidirectional image captured using a fisheye lens so that a position of a designated area in the omnidirectional image is located at a predetermined display position, based on the position of the designated area and a position of the predetermined display position, the designated area being for cutting out a partial image corresponding to the designated area from the omnidirectional image; and
    a display control unit configured to cause a display unit to display the partial image corresponding to the designated area and cut out from the omnidirectional image, and the omnidirectional image rotated by the rotation angle,
    wherein, in a case where a change instruction for changing the position of the designated area in the omnidirectional image is received, the determination unit further determines a rotation angle based on a position of the designated area changed in response to the change instruction and the position of the predetermined display position,
    wherein the display control unit updates the omnidirectional image to an omnidirectional image being rotated by the rotation angle based on the position of the designated area changed in response to the change instruction and the position of the predetermined display position, and updates the partial image to a partial image corresponding to the designated area changed in response to the change instruction, wherein the display control unit causes the display unit to display the partial image rotated so that a subject in the partial image is in an upright orientation and the omnidirectional image rotated by the rotation angle so that the subject in the omnidirectional image is in an upright orientation at the predetermined display position, and wherein the predetermined display position is in a region below a central position of the omnidirectional image and at a center of the region.

\* \* \* \* \*